(12) United States Patent
Hoch

(10) Patent No.: US 9,703,430 B2
(45) Date of Patent: Jul. 11, 2017

(54) DRIVING SENSOR ELECTRODES FOR PROXIMITY SENSING

(71) Applicant: Synaptics Incorporated, San Jose, CA (US)

(72) Inventor: David Hoch, Los Gatos, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 275 days.

(21) Appl. No.: 14/319,264

(22) Filed: Jun. 30, 2014

(65) Prior Publication Data

US 2015/0378467 A1    Dec. 31, 2015

(51) Int. Cl.
    *G06F 3/00*      (2006.01)
    *G06F 3/044*     (2006.01)
    *G06F 3/041*     (2006.01)

(52) U.S. Cl.
    CPC ............ *G06F 3/044* (2013.01); *G06F 3/0416* (2013.01); *G06F 2203/04108* (2013.01)

(58) Field of Classification Search
    CPC .............................. G06F 3/0418; G06F 3/0416
    See application file for complete search history.

(56) References Cited

U.S. PATENT DOCUMENTS

| | | | |
|---|---|---|---|
| 6,879,930 B2 | 4/2005 | Sinclair et al. | |
| 7,649,524 B2 | 1/2010 | Haim et al. | |
| 7,986,313 B2 | 7/2011 | Krah | |
| 8,054,300 B2 | 11/2011 | Bernstein | |
| 8,278,571 B2 | 10/2012 | Orsley | |
| 8,294,687 B1 | 10/2012 | Ksondzyk | |
| 8,519,975 B2 | 8/2013 | Huang et al. | |
| 8,542,215 B2 | 9/2013 | Hanauer et al. | |
| 2009/0273579 A1 | 11/2009 | Zachut et al. | |
| 2010/0026655 A1 | 2/2010 | Harley | |
| 2010/0149110 A1 | 6/2010 | Gray | |
| 2010/0292945 A1 | 11/2010 | Reynolds et al. | |
| 2010/0302201 A1 | 12/2010 | Ritter et al. | |
| 2011/0007021 A1 | 1/2011 | Bernstein et al. | |
| 2011/0025629 A1* | 2/2011 | Grivna .................. G06F 3/0416 345/173 |
| 2011/0175835 A1 | 7/2011 | Wang | |
| 2011/0279409 A1 | 11/2011 | Salaverry et al. | |

(Continued)

FOREIGN PATENT DOCUMENTS

| TW | 201203057 A | 1/2012 |
|---|---|---|
| WO | WO-2013013629 A1 | 1/2013 |

(Continued)

*Primary Examiner* — Michael Faragalla
(74) *Attorney, Agent, or Firm* — Patterson + Sheridan, LLP

(57) ABSTRACT

In an example, a processing system includes: a sensor module comprising sensor circuitry, the sensor module configured to: drive, during a first time period, a first sensor electrode of a first plurality of sensor electrodes for absolute capacitive sensing, a second sensor electrode of the first plurality of sensor electrodes with a reference signal, and at least one sensor electrode of a second plurality of sensor electrodes with a guard signal, to acquire first changes of capacitance between the first sensor electrode and at least one input object in proximity with the first sensor electrode; and a determination module configured to determine positional information for the at least one input object based at least in part on changes of capacitance acquired by the sensor module.

20 Claims, 13 Drawing Sheets

(56) References Cited

U.S. PATENT DOCUMENTS

| | | | |
|---|---|---|---|
| 2012/0044199 | A1 | 2/2012 | Karpin et al. |
| 2012/0050211 | A1 | 3/2012 | King et al. |
| 2012/0113047 | A1 | 5/2012 | Hanauer et al. |
| 2012/0154324 | A1 | 6/2012 | Wright et al. |
| 2012/0229418 | A1 | 9/2012 | Schwartz et al. |
| 2012/0229419 | A1 | 9/2012 | Schwartz et al. |
| 2012/0299874 | A1* | 11/2012 | Chang ............ G06F 3/0418 345/174 |
| 2012/0323524 | A1 | 12/2012 | Hatano |
| 2013/0002579 | A1 | 1/2013 | Hatano |
| 2013/0100071 | A1 | 4/2013 | Wright et al. |

FOREIGN PATENT DOCUMENTS

| | | |
|---|---|---|
| WO | WO-2013013634 A1 | 1/2013 |
| WO | WO-2013013637 A1 | 1/2013 |
| WO | WO-2013013663 A1 | 1/2013 |
| WO | WO-2013069290 A1 | 5/2013 |

\* cited by examiner

▨ ACTIVE
▨ REFERENCE
▨ GUARD

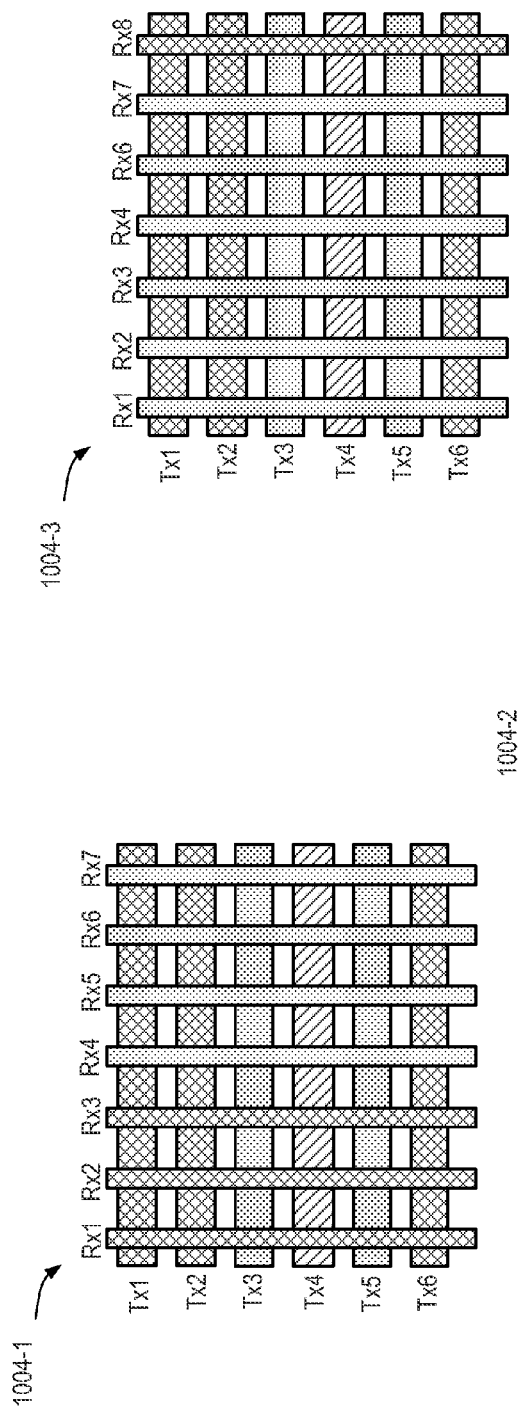
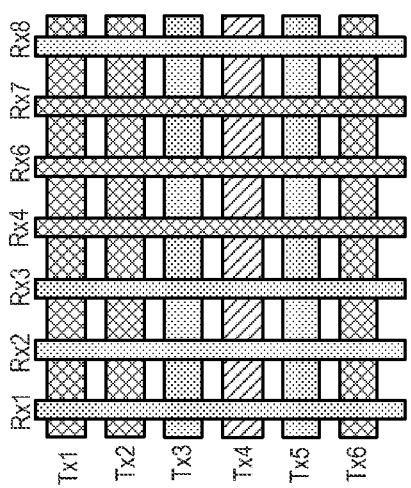
FIGURE 10B
FIGURE 10C
FIGURE 10D

DRIVING SENSOR ELECTRODES FOR PROXIMITY SENSING

BACKGROUND

Field of the Disclosure

Embodiments generally relate to input sensing and, in particular, to input sensing by driving sensor electrodes for proximity sensing.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Input objects can be at or near the surface of the proximity sensor device ("touch sensing") or hovering over the surface of the proximity sensor device ("proximity sensing" or "hover sensing"). Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

Proximity sensor devices can measure changes in mutual capacitance (or "transcapacitance") relating to the presence of an input object in a sensing region of the sensor device. Given an array of sensing regions, transcapacitance sensing can be used to generate a capacitive image, from which one or more input objects can be resolved at a given time. However, transcapacitance can produce less reliable results as the distance between the input objects and the proximity sensor device surface increases (e.g., proximity or hover sensing).

As an alternative to transcapacitance, proximity sensor devices can measure changes in self capacitance (or "absolute capacitance") relating to the presence of an input object in a sensing region. Sensing changes in absolute capacitance offers better proximity sensing than sensing changes in transcapacitance. Parasitic capacitances, however, limit the ability of the proximity sensor device to detect changes in absolute capacitance. If left uncontrolled, parasitic capacitances can cause significant signal loss, limiting the reliable distance in which the proximity sensor device can detect proximate object(s).

SUMMARY

Embodiments generally provide a processing system, input device and method of driving sensor to detect proximate objects. In an embodiment, a processing system includes: a sensor module comprising sensor circuitry, the sensor module configured to: drive, during a first time period, a first sensor electrode of a first plurality of sensor electrodes for absolute capacitive sensing, a second sensor electrode of the first plurality of sensor electrodes with a reference signal, and at least one sensor electrode of a second plurality of sensor electrodes with a guard signal, to acquire first changes of capacitance between the first sensor electrode and at least one input object in proximity with the first sensor electrode; and a determination module configured to determine positional information for the at least one input object based at least in part on changes of capacitance acquired by the sensor module.

In an embodiment, a method of driving sensor electrodes for capacitive sensing includes: driving, during a first time period, a first sensor electrode of a first plurality of sensor electrodes for absolute capacitive sensing, a second sensor electrode of the first plurality of sensor electrodes with a reference signal, and at least one sensor electrode of a second plurality of sensor electrodes with a guard signal, to acquire first changes of capacitance between the first sensor electrode and at least one input object in proximity with the first sensor electrode; and detecting the at least one input object based at least in part on changes of capacitance acquired by the sensor module.

In an embodiment, an input device includes: a first plurality of sensor electrodes and a second plurality of sensor electrodes orthogonal to the first plurality of sensor electrodes; a processing system coupled to the first and second pluralities of sensor electrodes, the processing system configured to: drive, during a first time period, a first sensor electrode of a first plurality of sensor electrodes for absolute capacitive sensing, a second sensor electrode of the first plurality of sensor electrodes with a reference signal, and at least one sensor electrode of a second plurality of sensor electrodes with a guard signal, to acquire first changes of capacitance between the first sensor electrode and at least one input object in proximity with the first sensor electrode; and detect the at least one input object based at least in part on changes of capacitance acquired by the sensor module.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other equally effective embodiments may be admitted.

FIGS. 9A-9C, 10A-10D, and 11A-11B show excitation cycles of various excitation schemes according to example implementations.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide input devices and methods that facilitate improved reliability in proximity sensing. In an example, an input device can include a sensor device that employs two sets of non-parallel sensor electrodes. The sensor device uses the sensor electrodes to form a sensing region in which input object(s) touching a surface of the input device, or hovering over the surface, can be detected (generally referred to as "proximity sensing"). Outside the sensing region, signal-to-noise ratios prevent the sensor device from reliably detecting input object(s). The sensor device can drive the sensor electrodes according to different excitation schemes to detect input object(s) in different regions within the sensing region.

For example, the sensing region can be divided into a first region and a second region. The first region, referred to as the "near-field region," is between the surface of the sensor device and the second region. The second region is referred to as the "far-field region." The sensor device can employ different excitation schemes, some of which more reliably detect input object(s) in one region than another. The sensor device can employ one or more excitation schemes to detect input object(s) in the near-field region. The sensor device can employ one or more different excitation schemes that operate to mitigate signal attenuation in order to detect input object(s) in the far-field region. Example far-field excitation schemes described herein extend the sensing region, increasing the reliable distance in which the sensor can detect input object(s). The sensor device can switch between excitation schemes dynamically, depending on the determined measurements. These and further aspects are described further below.

Figure 1:
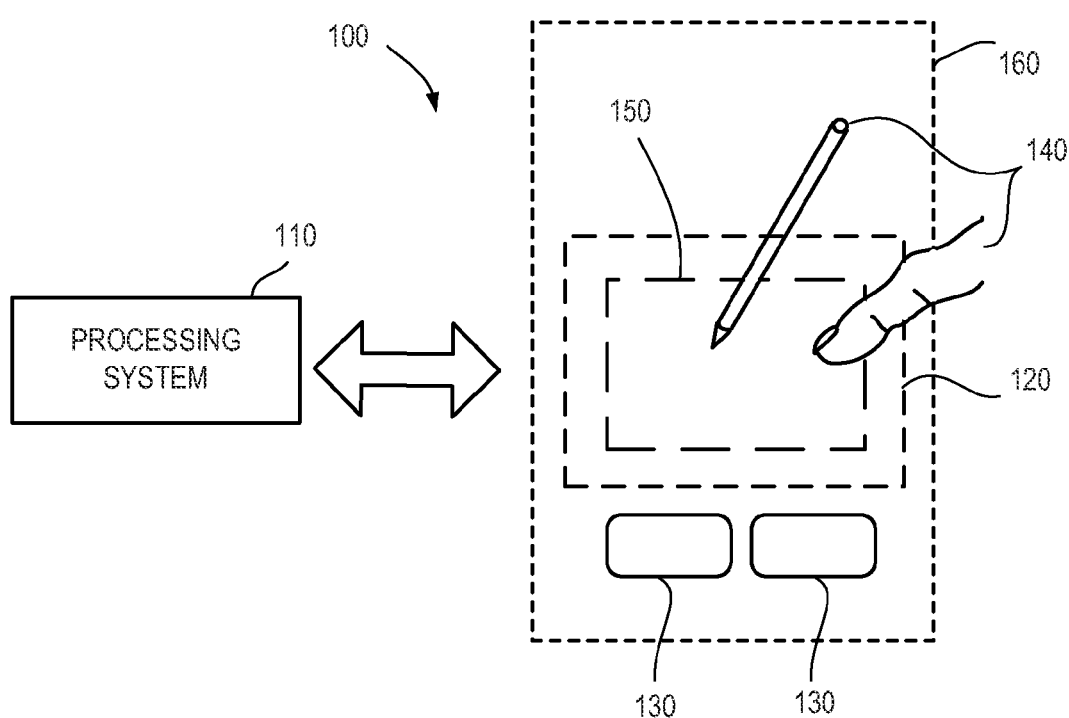
FIG. 1 is a block diagram of a system that includes an input device according to an example implementation.

Turning now to the figures, FIG. 1 is a block diagram of an exemplary input device 100 in accordance with embodiments. In various embodiments, the input device 100 comprises a sensing device and optionally a display device 160. In other embodiments, the input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and or parallel connections). Examples include I²C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Example input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance.") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components of the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments are described in the context of a fully functioning apparatus, the mechanisms of the embodiments are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
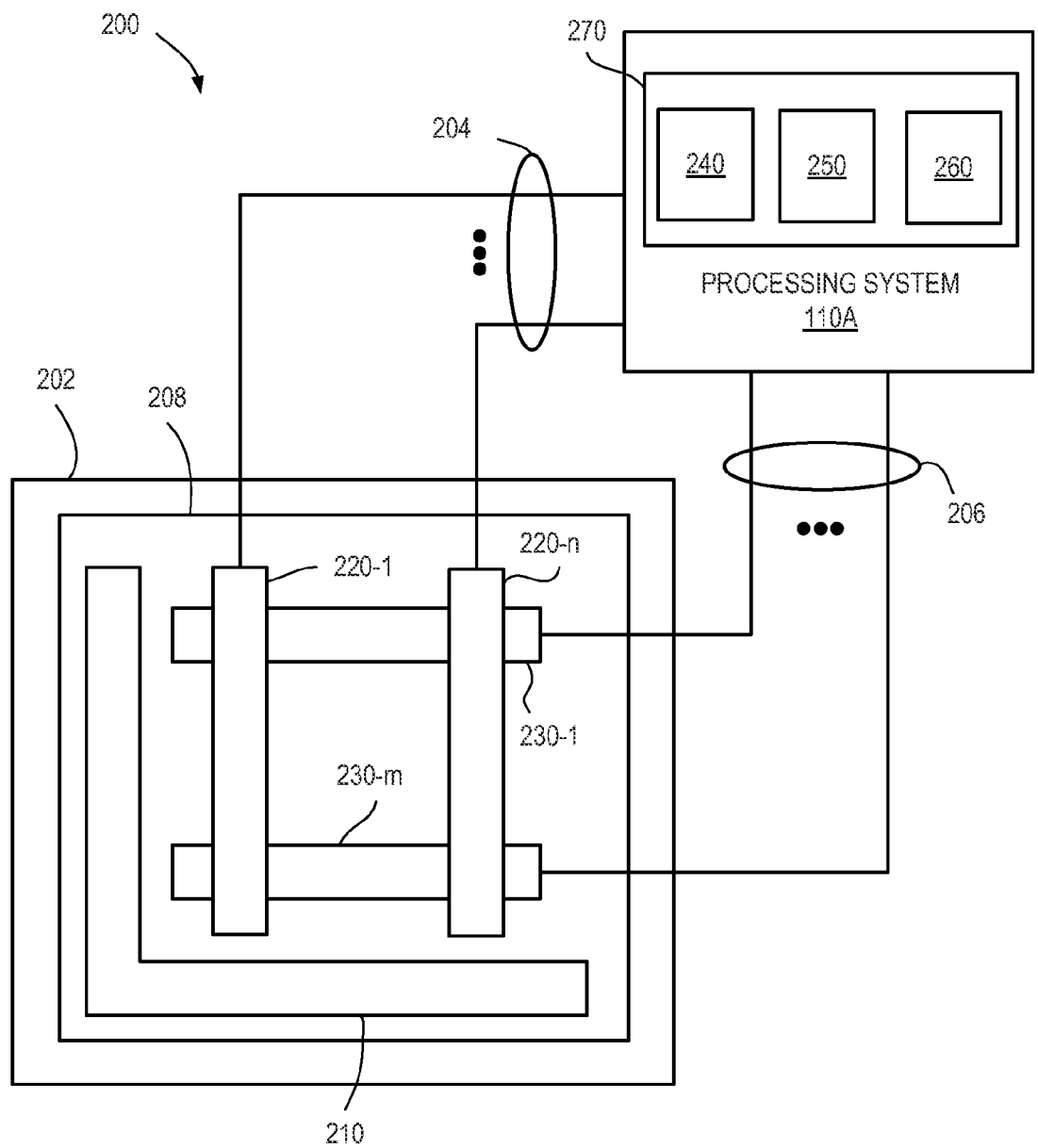
FIG. 2 is a block diagram depicting a capacitive sensor device for an input device according to an example implementation.

FIG. 2 is a block diagram depicting a capacitive sensor device 200 according to an example implementation. The capacitive sensor device 200 comprises an example implementation of the input device 100 shown in FIG. 1. The capacitive sensor device 200 includes a sensing device 208 that is disposed on a substrate 202 to provide the sensing region 120. The sensing device 208 includes sensor electrodes disposed on the substrate 202. The sensor electrodes function as sensing elements 150 of the sensing device 208. In the present example, the sensing device 208 includes two pluralities of sensor electrodes 220-1 through 220-n (collectively "sensor electrodes 220", and 230-1 through 230-m (collectively "sensor electrodes 230"), where m and n are integers greater than zero. The sensing device 208 can also include a plurality of electrodes 210. The sensor electrodes 220 and 230 are separated by a dielectric (not shown).

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. The electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

In the present example, the sensing device 208 is shown with the sensor electrodes 220, 230 arranged in an x/y grid of intersections. It is to be understood that the sensing device 208 is not limited to such an x/y arrangement, but instead can include numerous sensor patterns. Although the sensing device 208 is depicted as rectangular, the sensing device 208 can have other shapes, such as a circular shape.

The sensor electrodes 220 and 230 are coupled to an example implementation of the processing system 110 (referred to as "the processing system 110A") by conductive routing traces 204, 206. As used herein, general reference to the processing system 110 is a reference to the processing system described in FIG. 1 or any other embodiment thereof described herein (e.g., the processing system 110A, 110B, etc.). When in operation, the processing system 110A is coupled to the sensor electrodes 220, 230 through the conductive routing traces 204, 206 to implement the sensing region 120 for sensing inputs. In an example, the sensing region 120 can be divided operationally into a near-field region and a far-field region. The processing system 110A can drive the sensor electrodes 220, 230 according to a plurality of excitation schemes, one or more of which mitigate signal attenuation for reliable detection of input object(s) in the far-field region.

The electrodes 210 can be coupled to receive a reference voltage, such as system ground or other substantially constant voltage. In that respect, the electrodes 210 may be referred to as "ground traces." "System ground" may indicate a common voltage shared by system components. For example, a capacitive sensing system of a mobile phone can, at times, be referenced to a system ground provided by the phone's power source (e.g., a charger or battery). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200 can be located proximate to such a system ground electrode (e.g., located above a ground plane or backplane). In addition to the system ground electrode, the capacitive sensor device 200 can include the electrodes 210, which can be disposed at least partially around the sensor electrodes 220, 230.

The capacitive sensor device 200 can be utilized to communicate user input (e.g., a user's finger, a probe such as a stylus, and/or some other external input object) to an electronic system (e.g., computing device or other electronic device). For example, the capacitive sensor device 200 can be implemented as a capacitive touch screen device that can be placed over an underlying image or information display device (not shown). In this manner, a user would view the underlying image or information display by looking through substantially transparent elements in the sensing device 208. When implemented in a touch screen, the substrate 202 can include at least one substantially transparent layer (not shown). The sensor electrodes 220, 230 and the conductive routing traces 204, 206 can be formed of substantially transparent conductive material. Indium tin oxide (ITO) and/or thin, barely visible wires are but two of many possible examples of substantially transparent material that can be used to form the sensor electrodes 220, 230 and/or the conductive routing traces 204, 206. In other examples, the conductive routing traces 204, 206 can be formed of non-transparent material, and then hidden in a border region (not shown) of the sensing device 208.

In another example, the capacitive sensor device 200 can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensing device 208.

In general, the processing system 110A excites or drives sensor electrode(s) of the sensing device 208 with a capacitive sensing signal and measures an induced or resulting signal. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A capacitive sensing signal can be constant, substantially constant, or varying over time, and generally includes a shape, frequency, amplitude, and phase. A capacitive sensing signal can be referred to as an "active signal" as opposed to a "passive signal," such as a ground signal or other reference signal. A capacitive sensing signal can also be referred to as a "transmitter signal" when used in transcapacitive sensing.

In an example, the processing system 110A drives sensor electrode(s) of the sensing device 208 with a voltage and senses resulting respective charge on sensor electrode(s). That is, the capacitive sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110A can determine measurement(s) of capacitance from the sensed charge. In another example, the processing system 110A drives sensor electrode(s) of the sensing device 208 with charge and senses resulting respective voltage on sensor electrode(s). That is, the capacitive sensing signal is a signal to cause accumulation of charge (e.g., current signal) and the resulting signal is a voltage signal. The processing system 110A can determine measurement(s) of capacitance from the sensed voltage. In general, the term "capacitive sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, as well as measurements of a change in charge, current, voltage, and the like with respect to a baseline, from which capacitance or change in capacitance can be derived.

The processing system 110A can include a sensor module 240, a capacitive measurer module 250, and a position determiner module 260. The sensor module 240, the capacitive measurer module 250, and the position determiner module 260 comprise modules that perform different functions of the processing system 110A. In other examples, different configurations of modules can perform the functions described herein. The sensor module 240, the capacitive measurer module 250, and the position determiner module 260 can include sensor circuitry 270 and can also include firmware, software, or a combination thereof operating in cooperation with the sensor circuitry 270.

The sensor module 240 selectively drives signal(s) on one or more sensor electrodes of the sensing device 208 over one or more cycles ("excitation cycles") in accordance with one or more schemes ("excitation schemes"). Each excitation cycle has an associated time period during which signals are driven and measured. During each excitation cycle, the sensor module 240 can selectively sense resulting signal(s) from one or more sensor electrodes of the sensing device 208. In one type of excitation scheme, the sensor module 240 can selectively drive sensor electrodes of the sensing device 208 for absolute capacitive sensing. In absolute capacitive sensing, the sensor module 240 drives selected sensor electrode(s) with a capacitive sensing signal and senses resulting signal(s) from the selected sensor electrode(s). In such an excitation scheme, measurements of absolute capacitance between the selected sensor electrode(s) and input object(s) are determined from the resulting signal(s). In another type of excitation scheme, the sensor module 240 can selectively drive sensor electrodes of the sensing device 208 for transcapacitive sensing. In transcapacitive sensing, the sensor module 240 drives selected transmitter sensor electrode(s) with a capacitive sensing signal (e.g., transmitter signals) and senses resulting signals from selected receiver sensor electrode(s) (e.g., received signals). In such an excitation scheme, measurements of transcapacitance between transmitter and receiver electrodes are determined from the resulting signals. In any excitation scheme, the sensor module 240 can drive sensor electrodes of the sensing device 208 with other signals, including reference signals and guard signals, as discussed below.

The capacitive measurer module 250 performs capacitance measurements based on resulting signals obtained by the sensor module 240. The capacitance measurements can include changes in capacitive couplings between elements (also referred to as "changes in capacitance"). For example, the capacitive measurer module 250 can determine baseline measurements of capacitive couplings between elements without the presence of external input object(s). The capacitive measurer module 250 can then combine the baseline measurements of capacitive couplings with measurements of capacitive couplings in the presence of external input object(s) to determine changes in capacitive couplings. In another example, the sensor module 240 provides indicia of capacitance that already accounts for the baseline, and thus the capacitive measurer module 250 can determine changes in capacitance directly from such indicia of capacitance.

In an example, the capacitive measurer module 250 can perform a plurality of capacitance measurements associated with specific portions of the sensing region 120 as "pixels" to create a "capacitive image." A pixel of a capacitive image can be referred to as a location within the sensing region 120 in which a capacitive coupling can be measured using sensor electrode(s) of the sensing device 208. For example, a pixel can correspond to an intersection of sensor electrodes. The capacitive measurer module 250 can determine an array of capacitive coupling changes using the sensor electrodes 220, 230 to produce an x/y array of pixels that form a capacitive image. In this manner, the processing system 110 can capture a capacitive image that is a snapshot of the response measured in relation to input object(s) in the sensing region 120. A given capacitive image can include all of the pixels in the sensing region, or only a subset of the pixels.

In another example, the capacitive measurer module 250 can perform a plurality of capacitance measurements associated with a particular axis of the sensing region 120 to create a "capacitive profile" along that axis. The capacitive measurer module 250 can determine an array of capacitive coupling changes using the sensor electrodes 220, 230 to produce a capacitive profile along an axis of the sensing region 120. The array of capacitive coupling changes can include a number of points less than or equal to the number of sensor electrodes along the given axis. A capacitive profile can be formed from the measured points that spans at least a portion of the sensor electrodes along the given axis.

The sensor module 240 and the capacitive measurer module 250 can cooperate to obtain measurements of either absolute capacitance, transcapacitance, or a combination thereof. The processing system 110A can operate in multiple modes. The processing system 110A can operate in a first mode when detecting input object(s) in the near-field region ("near-field mode"), and a second mode when detecting input object(s) in the far-field region ("far-field mode"). In the near-field mode, the processing system 110A can employ one or more excitation schemes to obtain measurements of absolute capacitance, transcapacitance, or a combination thereof. In the far-field mode, the processing system 110A can employ one or more excitation schemes to obtain measurements of absolute capacitance in a manner that mitigates signal attenuation, as discussed below.

Measurement(s) of capacitance by the processing system 110A, such as capacitive image(s) or capacitive profile(s), enable the sensing of contact, hovering, or other user input with respect to the formed sensing regions by the sensing device 208. The position determiner module 260 can utilize the measurement(s) of capacitance to determine positional information with respect to a user input relative to the sensing regions formed by the sensing device 208. The position determiner module 260 can additionally or alternatively use such measurement(s) to determine input object size and/or input object type.

Figure 3:
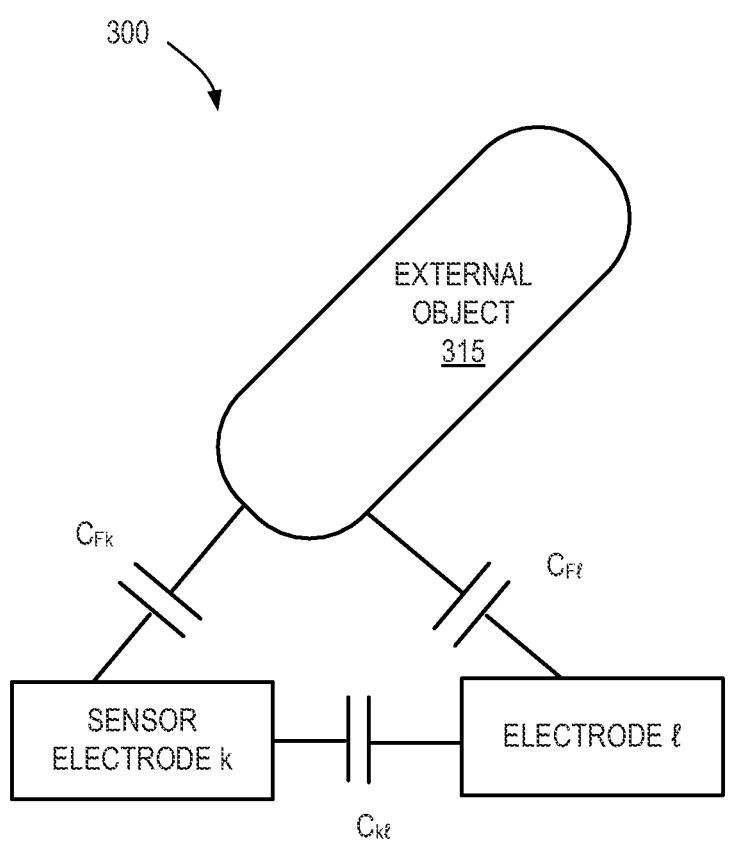
FIG. 3 shows a simplified model of a sensor with two sensor electrodes and one external object according to an example implementation.

FIG. 3 shows a simplified model 300 of a sensor with two sensor electrodes and an external object according to an example implementation. The model 300 includes an external object 315 and a sensor electrode designated "k", and an electrode designated "$\ell$". In general, the sensor electrode k is selected from the sensor electrodes 220, 230, and the electrode $\ell$ is selected from the sensor electrodes 220, 230, as well as electrodes 210. In examples below, the sensor electrode k is at potential $V_k$. The electrode $\ell$ can be another sensor electrode, a background plane/ground trace, or grounded electrode. The electrode $\ell$ is at a general potential $V\ell$, such as a reference potential $V_P$ (e.g., $V_P$ can be equal to, or offset from, a potential $V_B$ of the background plane/ground traces). The external object 315 represents input object(s) at potential $V_F$. An induced charge $Q_k$ resulting from potential difference(s) between the sensor electrode k and other conductive bodies is measured, including the external object at potential $V_F$ and the electrode $\ell$ at potential $V\ell$. In the model 300, $C_{Fk}$ shows the capacitive coupling between sensor electrode k and the external object 315; $C_F\ell$ shows the capacitive coupling between the sensor electrode $\ell$ and the external object 315; and $C_k\ell$ shows the capacitive coupling between sensor electrodes k and 1. The induced charge $Q_k$ is proportional to the appropriate voltage differences and proportional to an accumulating capacitance $C_t$, which has many components, including parasitic components. By way of example, the model 300 has been simplified. In practical applications, there may be additional external objects (that may or may not be intended as input objects), other sensor electrodes, noise, etc.

In the general case, the induced charge difference at the sensor electrode k can be described by:

$$\Delta Q_k = Q_k^b - Q_k = \sum_{\ell \in E\{k\}} (V_\ell - V_k)(\Delta C_t(\ell, k) - C_{LGM}(\ell, k)), \quad \text{Eq. 1}$$

where $$\Delta C_t(\ell, k) = C_t^b(\ell, k) - C_t(\ell, k), \quad \text{Eq. 2}$$

and E is the set of electrodes, $Q\_k\hat{}b$ is baseline induced charge in absence of the external object 315, $\Delta C_t(\ell,k)$ is the change in transcapacitance $C_t$ between sensor electrodes k and $\ell$ with respect to baseline transcapacitance $C\_t\hat{}b$, and $C_{LGM}(\ell,k)$ is the parasitic transcapacitance due to a low ground mass (LGM) condition. When the grounding condition of the input device or electronic system is low or otherwise non-optimal (e.g., when the input device is lying on a desk, rather than being held by a user), the device/system is said to be in an LGM condition. The LGM term can vary depending on the grounding condition of the input device or electronic system. Even if the input device is in an ideal grounding condition, the LGM term provides a contribution to the induced charge at the sensor electrode k. By definition, when the external object 315 is not present, the terms $\Delta C_t(\ell,k)$ and $C_{LGM}(\ell,k)$ vanish.

Referring to FIGS. 2 and 3, the processing system 110A can drive the sensor electrodes 220, 230 to implement a transcapacitive excitation scheme. When the external object 315 is present, the term $\Delta C_t(\ell,k)$ represents the change in transcapacitance to be detected and the term $C_{LGM}(\ell,k)$ is parasitic in transcapacitive sensing. From Equation 1, the parasitic LGM capacitance is additive in transcapacitive sensing and thus point-wise shifts the transcapacitive results for each electrode pair k, $\ell$. Further, the transcapacitive term $\Delta C_t(\ell,k)$ decays faster than the parasitic LGM term $C_{LGM}(\ell,k)$ as external object 315 moves farther from the sensing device 208. At some distance, the transcapacitive term $\Delta C_t(\ell,k)$ vanishes or becomes negligible. In some examples, the distance at which the change transcapacitance becomes negligible denotes the boundary between the near-field region and the far-field region. Thus, the processing system 110A can implement the transcapacitive excitation scheme in the near-field mode in order to obtain a capacitive image when the external object 315 is in the near-field region.

The processing system 110A can also drive the sensor electrodes 220, 230 to implement an absolute capacitive excitation scheme. To gain better insight into absolute capacitive sensing, the electrodes can be divided into three groups: K denotes the set of sensor electrodes driven at a potential $V_K$ (e.g., active electrodes), P is a subset of electrodes driven at a known reference potential $V_P$ (e.g., passive electrodes), and B includes the background plane/ground traces at potential $V_B$ (e.g., which can be the same as $V_P$ or other reference voltage (e.g., system ground)). Thus, the set E of electrodes is the union of sets K, P, and B. For absolute capacitive sensing, equation 1 can be rewritten as:

$$\Delta Q_k^a = (V_K - V_P)(\xi_{LGM}^a C_{Fk} - \eta_\Delta^a) \quad \text{Eq. 3,}$$

where the superscript "a" denotes absolute capacitive sensing, $\xi\_LGM\hat{}\alpha$ denotes a parasitic LGM term due to parasitic LGM capacitance, and $\eta\_\Delta\hat{}\alpha$ denotes a parasitic transcapacitance term. In absolute capacitive sensing, the indicia of capacitance, $\Delta Q\_k\hat{}\alpha$, is an absolute capacitive result. From Equation 3, the parasitic LGM term for absolute capacitive sensing is multiplicative and thus point-wise scales the absolute capacitive results. The parasitic transcapacitance is additive and thus point-wise shifts the absolute capacitive results. Generally, both terms $\xi\_LGM\hat{}\alpha$ and $\eta\_\Delta\hat{}\alpha$ correspond to point-wise values in a capacitive profile. The terms vanish when there is no change in induced charge at the sensor electrode k, and grow as the change in induced charge grows. Also, when the term $\eta\_\Delta\hat{}\alpha$ is minimized, the term $\xi\_LGM\hat{}\alpha$ is maximized. The term $\eta\_\Delta\hat{}\alpha$ depends on the passive electrodes in the subset P, whereas the term $\xi\_LGM\hat{}\alpha$ depends on the active electrodes in the subset K.

In one absolute sensing excitation scheme (referred to as the "α-scheme"), all sensor electrodes 220, 230 are in the subset K and excited with potential $V_K$. That is, the subset P is empty, and only the background plane/ground traces 210 are at a reference potential $V_B$. The α-scheme is also referred to as the "guarded absolute capacitance" scheme. In the α-scheme, an induced charge difference, designated $\Delta Q\_k\hat{}$ ($\alpha(\alpha)$), can be obtained for the sensor electrode k (referred to as an "α-result"). In the α-scheme, the parasitic transcapacitance term $\eta\_\Delta\hat{}\alpha$ is approximately zero, but the parasitic LGM term $\xi\_LGM\hat{}\alpha$ is much less than one. In the α-scheme, Equation 3 can be rewritten as:

$$\Delta Q_k^{\alpha(\alpha)} \approx (V_K - V_B)\xi_{LGM}^{\alpha(\alpha)} C_{Fk} \qquad \text{Eq. 4.}$$

The α-result, $\Delta Q\_k\hat{}(\alpha(\alpha))$, exhibits significant point-wise scaling by parasitic multiplicative LGM term, $\xi\_LGM\hat{}\alpha(\alpha)$ (i.e., the parasitic transcapacitance term is negligible). In the α-scheme, the magnitude of the α-result can be reduced by 50% or more. However, since all electrodes are excited with the same potential $V_K$, the processing system 110A can obtain α-results for all sensor electrodes 220, 230 in one excitation cycle. As the distance between the sensing device 208 and the external object 315 increases, the α-result becomes even more attenuated and the parasitic LGM scaling becomes more deleterious. Thus, the α-scheme may produce more reliable results in the near-field region than in the far-field region. The processing system 110A can implement the α-scheme in the near-field mode in order to obtain α-results and form capacitive profiles from such α-results.

In another absolute sensing scheme (referred to as a "β-scheme"), the subset P is driven with a reference potential, e.g., $V_P = V_B$. The subset K is driven with the potential $V_K$. The processing system 110A can implement different β-schemes depending on the number of electrodes in the subsets K and P. Assume the sensor electrode k is in the subset K, and the electrode ℓ is in the subset P. In a given β-scheme, an induced charge difference, designated $\Delta Q\_k\hat{}$ ($\alpha(\beta)$), can be obtained for the sensor electrode k (referred to as a "β-result"). The magnitudes of the parasitic LGM and transcapacitance terms depend on the number of electrodes in the subset P.

In one β-scheme, the subset K includes only the sensor electrode k, and the subset P includes all other electrodes (referred to as the "β[E\k]-scheme"). Generally, in the β[E\k]-scheme, the parasitic transcapacitance term $\eta\_\Delta\hat{}\alpha$ can be much greater than one, but the parasitic LGM term $\xi\_LGM\hat{}\alpha$ is approximately one. Hence, a β-result can exhibit significant point-wise translation with approximately no scaling. However, as discussed above, as the distance between the sensing device 208 and the external object 315 increases, the change in transcapacitance $C_k\ell$ decreases and eventually vanishes or becomes negligible. Provided the external object 315 is sufficiently far away (e.g., in the far-field region), the change induced in the transcapacitance $C_k\ell$ is approximately zero, and hence the parasitic transcapacitance term $\eta\_\Delta\hat{}\alpha$ is approximately zero. Hence, in the β[E\k]-scheme with the external object 315 in the far-field region, the β-result exhibits approximately no point-wise scaling by parasitic LGM capacitance and also no shifting due to parasitic transcapacitance. The β-result exhibits significantly less attenuation than the α-result. However, while a set of α-results can be obtained for all sensor electrodes in one excitation cycle, multiple excitation cycles are needed to obtain a set of β-results.

In the absolute capacitive sensing schemes discussed above, there is a parasitic background capacitance between electrode k and the background. The processing system 110A measures the parasitic background capacitance to form the baseline. In the α-scheme, the parasitic background capacitance between the sensor electrode k and the background plane/ground traces is minimized in the sense that there is no coupling between transmitters and/or receivers. In the β[E\k]-scheme, the parasitic background capacitance between the sensor electrode k and all other electrodes in the subset P is larger due to additional couplings between transmitters and/or receivers. A large parasitic background capacitance can increase settling time of the sensor electrode k, and can increase the magnitude of induced charge that needs to be measured for the baseline thereby increasing the required dynamic range of the processing system 110A.

The processing system 110A can implement one or more other β-schemes having less parasitic background capacitance than the β[E\k]-scheme. Each additional sensor electrode removed from the subset P and added to the subset K reduces the parasitic background capacitance, but also attenuates the β-result by $\xi\_LGM\hat{}(\alpha(\beta[E\backslash k]))$. When all sensor electrodes are in the subset K, the parasitic background capacitance is minimized and the β-result is attenuated by a factor of $\xi\_LGM\hat{}(\alpha(\alpha))$ becoming the α-result as described above in Eq. 4. The processing system 110A can balance the attenuation of the β-results against the increase in parasitic background capacitance to select and employ one or more β-schemes to detect the external object 315. The selection can be static (e.g., always select the β-scheme with the largest parasitic background capacitance that can be handled), or dynamic (e.g., select a β-scheme based on signal attenuation, noise, object distance, etc.). In one example, the processing system 110A can employ one or more β-schemes and then combine the obtained β-results to produce combined β-results. By combining β-results of different β-schemes, the processing system 110A can effectively implement a particular β-scheme that exhibits a parasitic background capacitance outside the dynamic range, such as the β[E\k]-scheme.

Figure 4:
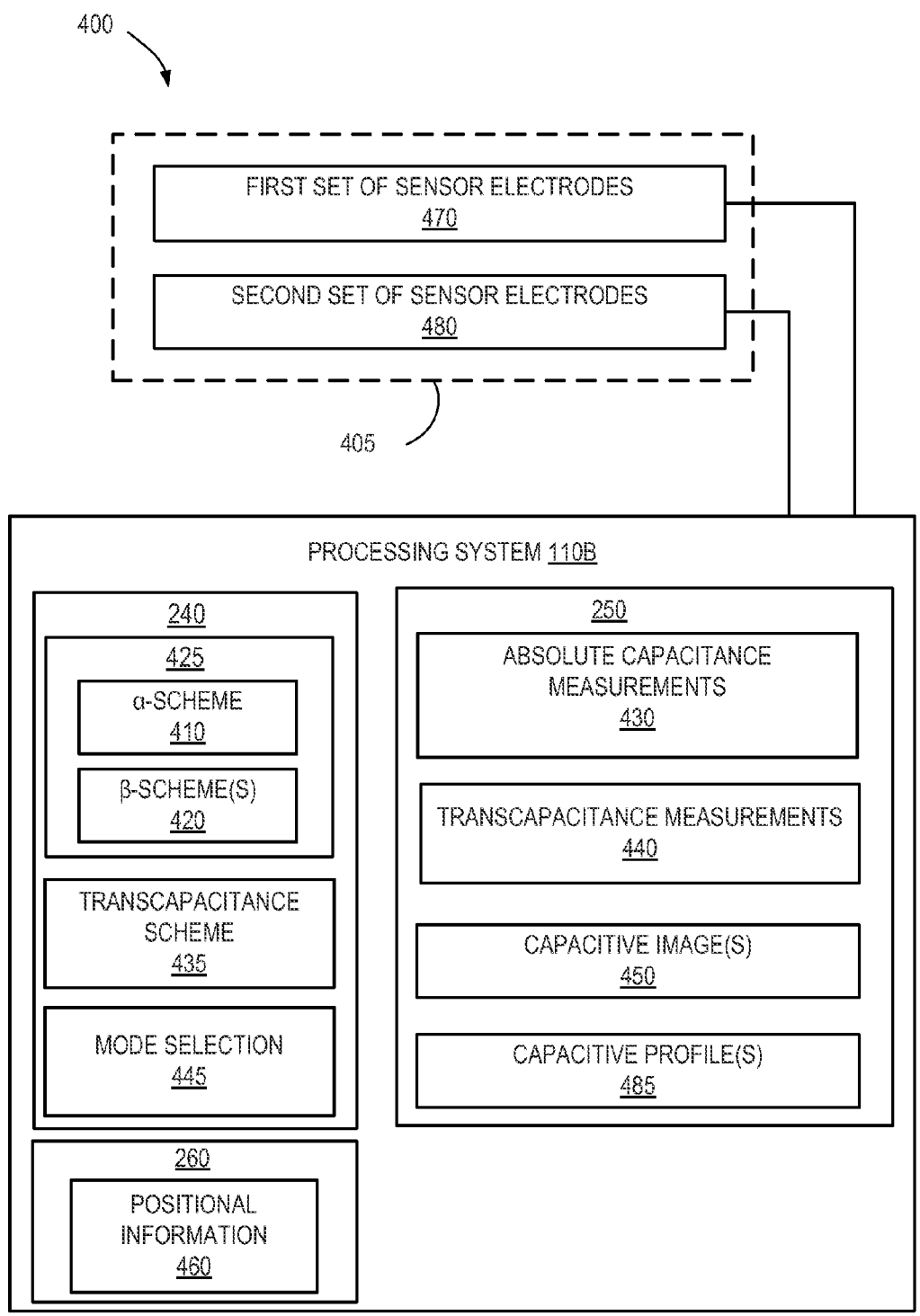
FIG. 4 is a block diagram depicting a capacitive sensor device according to an example implementation.

FIG. 4 is a block diagram depicting a capacitive sensor device 400 according to an example implementation. The capacitive sensor device 400 is an example implementation of the capacitive sensing device 200. The capacitive sensor device 400 includes sensor electrodes 405 coupled to an example implementation of the processing system 110 ("the processing system 110B"). The sensor electrodes 405 include a first set of sensor electrodes 470 and a second set of sensor electrodes 480. In an example, the first set of sensor electrodes 470 can be disposed along a first axis, and the second set of sensor electrodes 480 can be disposed along a second axis. In an example, the first axis is orthogonal to the second axis such that the sensor electrodes 470 are orthogonal to the sensor electrodes 480. In an example, the sensor electrodes in one set can have a different geometry than the sensor electrodes in the other set (e.g., electrodes in one set can be wider and more closely distributed than electrodes in the other set, which can be thinner and more sparsely distributed).

The sensor module 240 includes a module 425 for driving the sensor electrodes 405 in an absolute capacitive sensing scheme, a module 435 for driving the sensor electrodes 405 in a transcapacitive sensing scheme, and a mode selection module 445. The module 425 includes a module 410 for implementing the α-scheme, and a module 420 for implementing one or more β-schemes. In the transcapacitive scheme, the module 435 drives one or more of the sensor electrodes 405 with transmitter signal(s) (e.g., electrode(s) in the second set 480) and receives resulting signals on others of the sensor electrodes 405 (e.g., electrodes in the first set 470). Those of the sensor electrodes 405 that are not driven with transmitter signal(s) or sensed to receive resulting signals can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal.

The module 435 can perform one or more excitation cycles, each with different sensor electrode(s) being driven with transmitter signal(s). The module 435 can provide transcapacitive results obtained in each of the excitation cycle(s) to the capacitive measurer module 250, which determines transcapacitance measurements 440. The capacitive measurer module 250 can determine capacitive image(s) 450 from the transcapacitance measurements 440.

In an absolute sensing scheme, the module 425 drives one or more of sensor electrodes 405 with a capacitive sensing signal (e.g., electrode(s) in the first set 470) and receives resulting signals from such electrode(s). Those of the sensor electrodes 405 that are not driven with a capacitive sensing signal can be driven with a reference signal, a guard signal, or left floating (i.e., not driven with any signal). Similar to transcapacitive sensing, a guard signal can be a signal that is similar or the same in at least one of shape, amplitude, frequency, or phase of the capacitive sensing signal. The module 425 can perform one or more excitation cycles, each with different sensor electrodes being driven with a capacitive sensing signal, reference signal, guard signal, and/or left floating. In particular, the module 410 can implement the α-scheme to obtain α-results, and/or one or more β-schemes to obtain β-results.

The module 425 can provide absolute capacitive results (e.g., α-results, and/or β-results) obtained in each of the excitation cycle(s) to the capacitive measurer module 250, which determines absolute capacitance measurements 430. The capacitive measurer module 250 can determine capacitive profile(s) 485 and/or capacitive image(s) 450 from the absolute capacitance measurements 430. The position determiner module 260 can determine the position information 460 from the capacitive image(s) 450 and/or capacitive profile(s) 485.

The mode selection module 445 can control which of one or more excitation schemes the sensor module 240 will employ to obtain capacitance measurements. The mode selection module 445 can be part of the sensor module 240 as shown, can be part of another module (e.g., the capacitive measurer module 250), or can be a separate module in the processing system 110B. The mode selection module 445 can dynamically switch between a near-field mode and a far-field mode. In the near-field mode, the mode selection module 445 controls the sensor module 240 to implement one or more excitation schemes that can reliably detect input object(s) in the near-field region. For example, in the near-field mode, the sensor module 240 can implement transcapacitive and/or absolute capacitive sensing scheme(s). In the far-field mode, the mode selection module 445 controls the sensor module 240 to implement one or more excitation schemes that can reliably detect input object(s) in the far-field region. For example, in the far-field mode, the sensor module 240 can implement one or more β-schemes.

The mode selection module 445 can cause the sensor module 240 to switch excitation schemes based on the resulting signals received by the current excitation scheme. For example, the mode selection module 445 can first invoke the near-field mode, and the sensor module 240 can implement the α-scheme, one or more β-schemes, and/or the transcapacitive scheme to detect input object(s). If the resulting signals do not satisfy defined threshold(s) for the near-field mode, the mode selection module 445 can invoke the far-field mode, and the sensor module 240 can implement one or more β-schemes. The mode selection module 445 can statically select particular β-schemes, or can dynamically select particular β-schemes based on the resulting signals. If the resulting signals do not satisfy defined threshold(s) for the far-field mode, the mode selection module 445 can again invoke the near-field mode.

While the β-schemes are described as being used in the far-field mode, In some examples, the one or more β-schemes can be employed in the near-field mode. In the near-field region, the parasitic transcapacitance is no longer negligible, and thus there is a point-wise signal loss as a consequence. However, in some cases, a particular β-scheme can generate stronger resulting signals than the α-scheme even in the near-field region. Thus, the mode selection module 445 can select particular β-schemes even in the near-field region.

Figure 5:
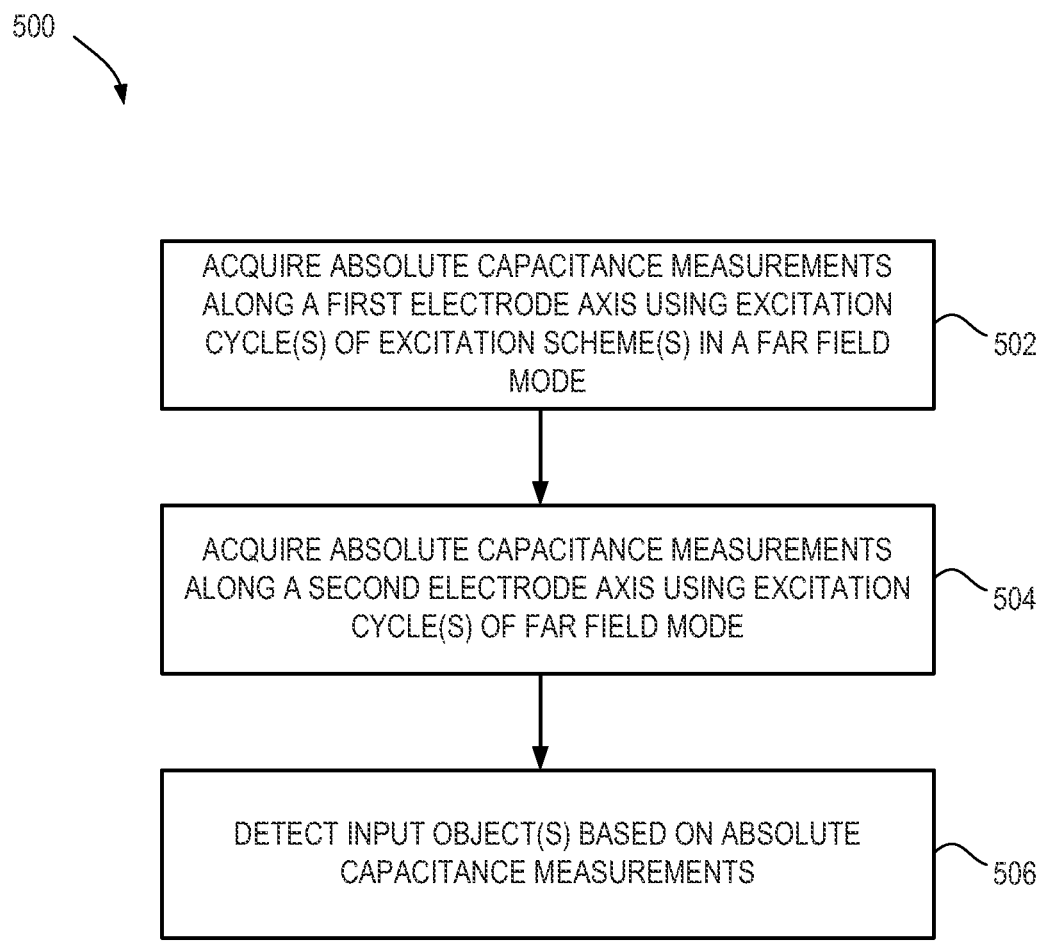
FIG. 5 is a flow diagram depicting a method of driving sensor electrodes for capacitive sensing in an example implementation.
Figure 6:
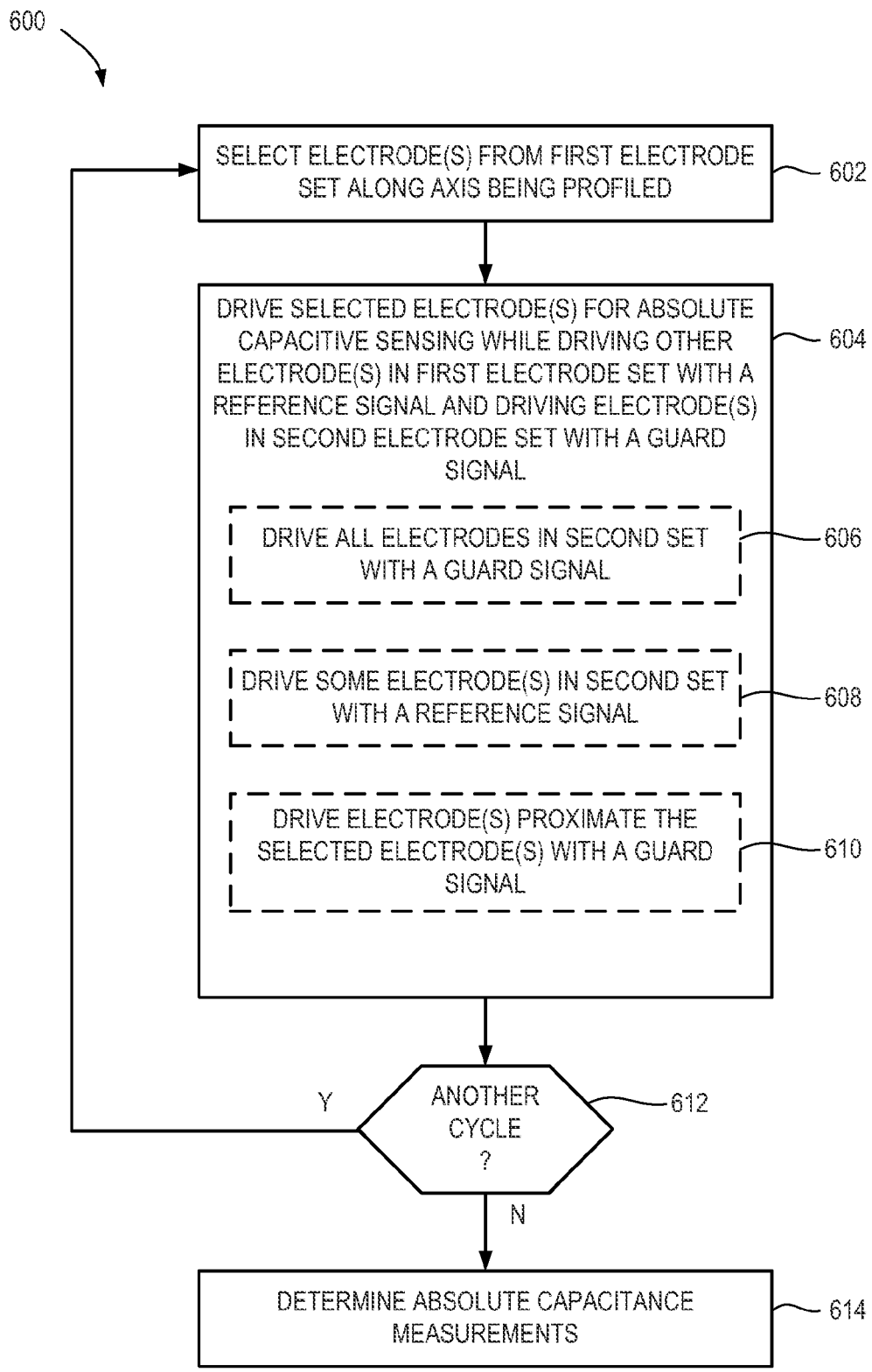
FIG. 6 is a flow diagram depicting another method of driving sensor electrodes for capacitive sensing in an example implementation.
Figure 7:
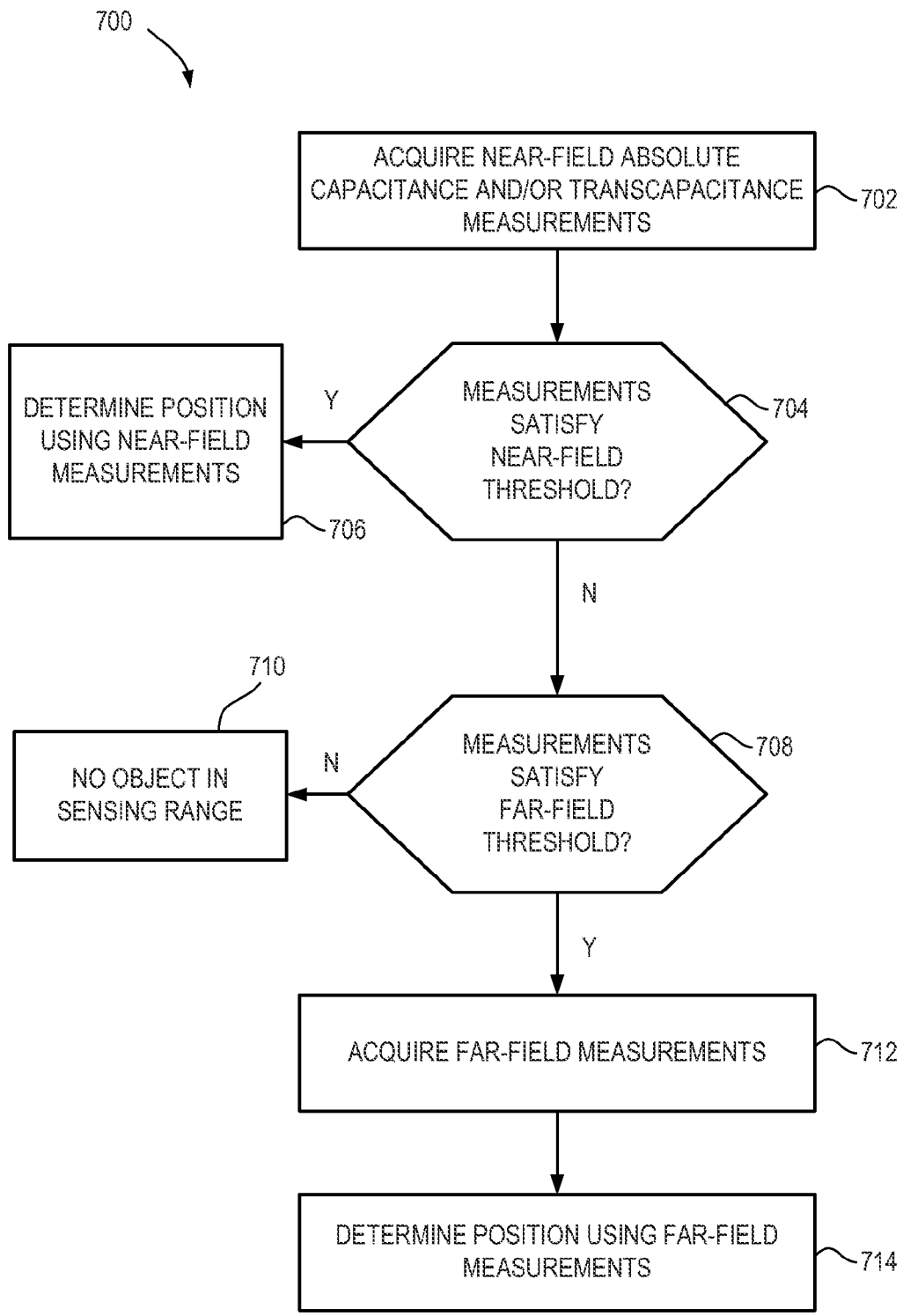
FIG. 7 is a flow diagram depicting another method of driving sensor electrodes for capacitive sensing in an example implementation.
Figure 8:
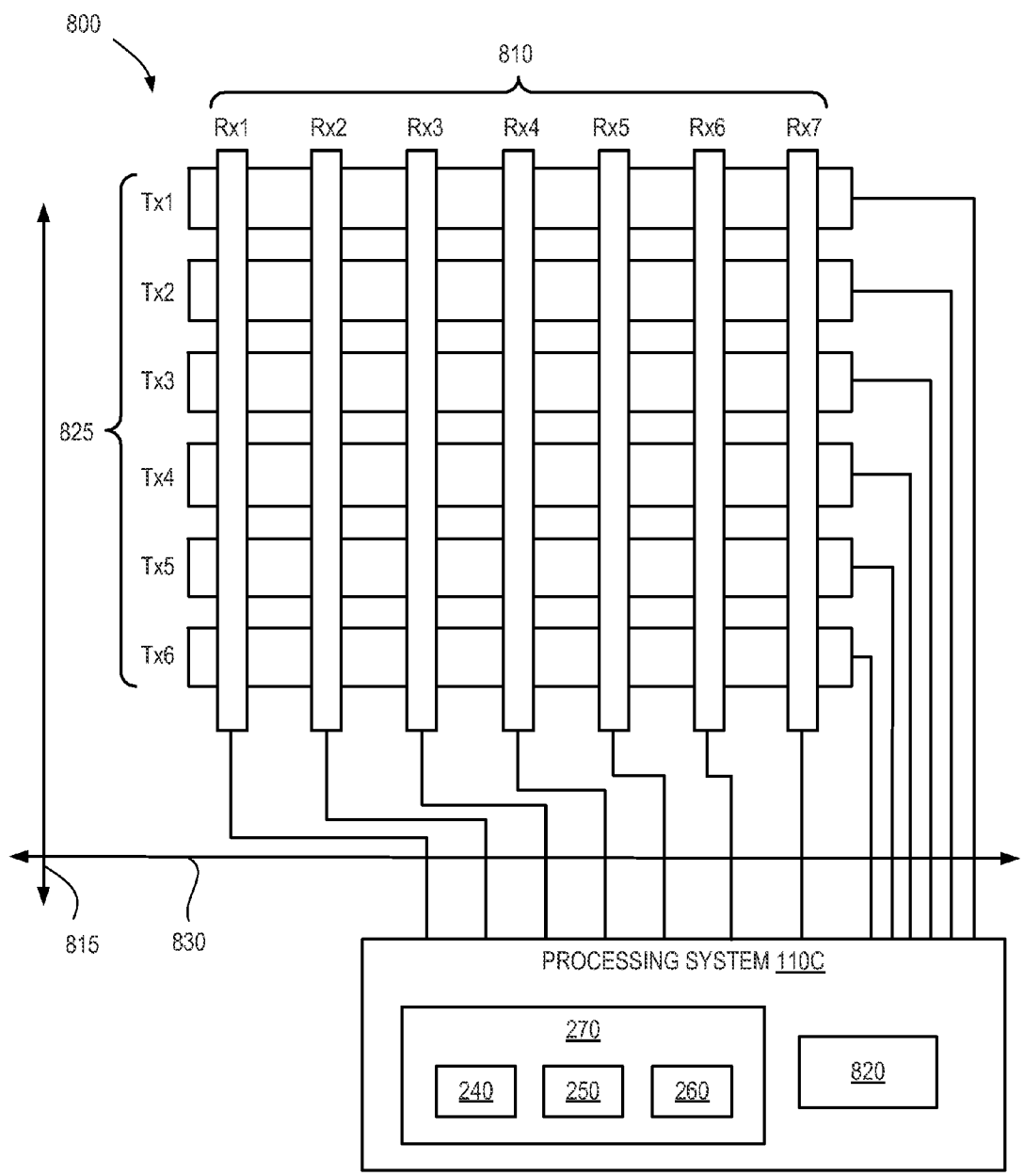
FIG. 8 shows another capacitive sensing device according to an example implementation.

FIGS. 5-7 depict flow diagrams showing methods of driving sensor electrodes for capacitive sensing according to example implementations. FIG. 8 shows an example capacitive sensing device 800 according to an example implementation. The capacitive sensing device 800 is an example implementation of the capacitive sensor device 400. FIGS. 9A-9C, 10A-10D, and 11A-11B show example excitation schemes for the capacitive sensing device 800. Aspects of the methods in FIGS. 5-7 can be understood with references to the examples of FIGS. 8, 9A-9C, 10A-10D; and 11A-11B by way of example and not limitation.

As shown in FIG. 8, the capacitive sensing device 800 includes sensor electrodes 810 along a first axis 830, and sensor electrodes 825 along a second axis 815 that is not parallel to the first axis 830. In an example, the first axis 830 is orthogonal to the second axis 815. For convenience of description, the first axis 830 may be referred to as the "x-axis", and the second axis 815 may be referred to as the "y-axis". The sensor electrodes 810 include receivers Rx1 through Rx7. The sensor electrodes 825 include transmitters Tx1 through Tx6. The sensor electrodes 825 are wider and more closely distributed than the sensor electrodes 810. The sensor electrodes 810, 825 are coupled to an example implementation of the processing system 110 ("processing system 110C"). While FIG. 8 shows an example of transmitter and receiver electrodes, where the transmitters are wider and more closely distributed than the receivers, it is to be understood that the methods described in FIGS. 5-7 can be employed on sensing devices having two sets of electrodes in general, which can have the same or different surface area and the same or different distribution.

The processing system 110C includes similar features that have been previously described for the processing systems 110, 110A, and 110B, including the sensor circuitry 270, the sensor module 240, the capacitive measurer module 250, and the position determiner module 260.

FIG. 5 is a flow diagram depicting a method 500 of driving sensor electrodes for capacitive sensing in an example implementation. The method 500 begins at step 502, where the processing system 110C acquires absolute capacitance measurements along a first electrode axis using excitation cycle(s) of absolute capacitance excitation scheme(s) in a far-field mode. In an embodiment, the processing system 110C drives the sensor electrodes 810, 825 over excitation cycle(s) of one or more β-schemes. Assume the first axis is the axis 830 along which the sensor electrodes 810 are distributed. The processing system 110C can employ β-scheme(s) where some electrode(s) from the sensor electrodes 810 are in the subset K of active electrodes, other electrodes from the sensor electrodes 810, 825 are in the subset P of passive electrodes, and optionally some electrodes from the sensor electrodes 810, 825 are guarded or left floating. The processing system 110C obtains β-results, which can be combined or otherwise processed to obtain the absolute capacitance measurements along the axis 830.

At step 504, the processing system 110C acquires absolute capacitance measurements along a second electrode axis using excitation cycle(s) of absolute capacitance excitation scheme(s) in a far-field mode. Assume the second axis is the axis 815 along which the sensor electrodes 825 are distributed. The processing system 1100 can employ β-scheme(s) where some electrode(s) from the sensor electrodes 825 are in the subset K of active electrodes, other electrodes from the sensor electrodes 810, 825 are in the subset P of passive electrodes, and optionally some electrodes from the sensor electrodes 810, 825 are guarded or left floating. The processing system 110C obtains β-results, which can be combined or otherwise processed to obtain the absolute capacitance measurements along the axis 815.

At step 506, the processing system 110C detects input object(s) based on the absolute capacitance measurements obtained in steps 502 and 504. For example, the absolute capacitance measurements from step 502 can be used to determine a capacitive profile along the first axis (e.g., x-axis), and the absolute capacitive measurements from step 504 can be used to determine a capacitive profile along the second axis (e.g., y-axis). The x-y profiles can be used to determine input object position in the far-field region.

FIG. 6 is a flow diagram depicting a method 600 of driving sensor electrodes for capacitive sensing in an example implementation. At step 602, the processing system 110C selects electrode(s) from a first electrode set to be driven with a capacitive sensing signal. The first electrode set is the set of electrodes along the axis being profiled. By way of example, assume the axis being profiled is the axis 830 (x-axis). Thus, the first electrode set includes the electrodes 810 (e.g., receivers).

At step 604, the processing system 110C drives the selected electrode(s) for absolute capacitive sensing while driving other electrode(s) in the first set with a reference signal and driving electrode(s) in the second set with a guard signal. In an embodiment, the processing system 110C can implement an excitation cycle of a β-scheme. At optional step 606, the β-scheme can include driving all electrodes in the second set with a guard signal. At optional step 608, the β-scheme can include driving electrode(s) in the second set with a reference signal. At optional step 610, the β-scheme can include driving electrode(s) proximate the selected electrode(s) with a guard signal.

At step 612, the processing system 110C determines whether another excitation cycle should be performed. If so, the method 600 returns to step 602. Additional excitation cycle(s) can be performed using the same β-scheme and/or additional excitation cycle(s) can be performed using one or more additional β-schemes. If no more excitation cycles are required, the method 600 proceeds from step 612 to step 614. At step 614, the processing system 110C determines absolute capacitance measurements from the set of results produced in step 604.

Figure 9A:
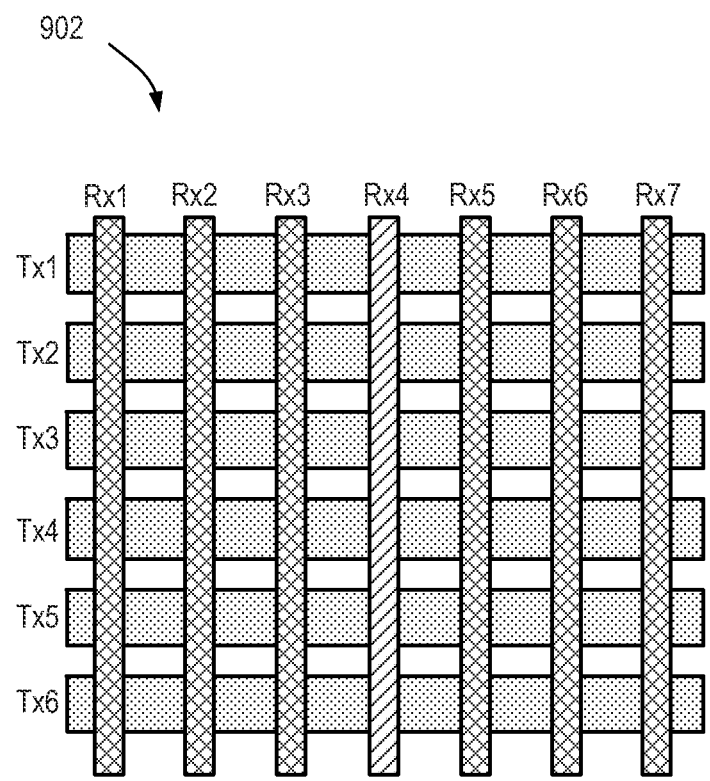

FIGS. 9A-9C, 10A-10D, and 11A-11B show example excitation schemes that can be used in step 604. FIG. 9A shows an excitation cycle 902 of an example β-scheme according to an example implementation. The receiver electrode Rx4 is selected and driven with a capacitive sensing signal. The remaining receiver electrodes Rx1-Rx3 and Rx5-Rx7 are driven with a reference signal. The transmitter electrodes Tx1-Tx6 are driven with a guard signal. Thus, FIG. 9A shows a β[Rx\k]-scheme, where the kth receiver (Rx4 in the present example) and the guarded Tx1-Tx6 electrodes are in the subset K and all other electrodes are in the subset P of passive electrodes (Rx1-Rx3 and Rx5-Rx7).

Assuming sparse distribution between the receivers, the difference between parasitic background capacitance for a given β-scheme, where the active electrodes are selected from the receivers, and the parasitic background capacitance from the alpha-mode can be approximated by:

$$N_{tx}C_t + 2 \cdot C_{rx,rx}^b \qquad \text{Eq. 5,}$$

where $N_{tx}$ is the number of transmitter electrodes in the subset P, $C_t$ is the receiver-transmitter transcapacitive coupling in the absence of an external object, and $C\_(rx,rx)\hat{}b$ is the baseline receiver-receiver transcapacitive coupling between neighboring receivers. With the β[Rx\k]-scheme shown in FIG. 9A, there are no transmitters in the subset P, and hence the parasitic background capacitance is increased from the (minimum) alpha-mode by a factor of two times the receiver-receiver capacitive coupling. Since the receivers Rx1-Rx7 can be thin and sparsely distributed, the transcapacitance between Rx4 and neighboring Rx3 and Rx5 is small. In some examples, the receivers Rx1-Rx7 have a geometry such that the receiver-receiver capacitive coupling can be neglected, and the parasitic background capacitance in the β[Rx\k]-scheme is approximately equal to the (minimum) parasitic background capacitance.

Figure 9B:
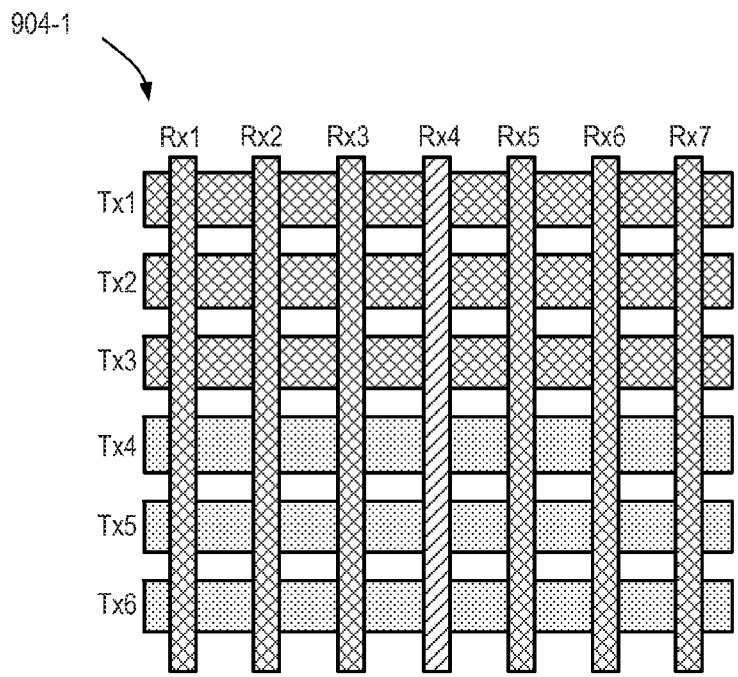
Figure 9C:
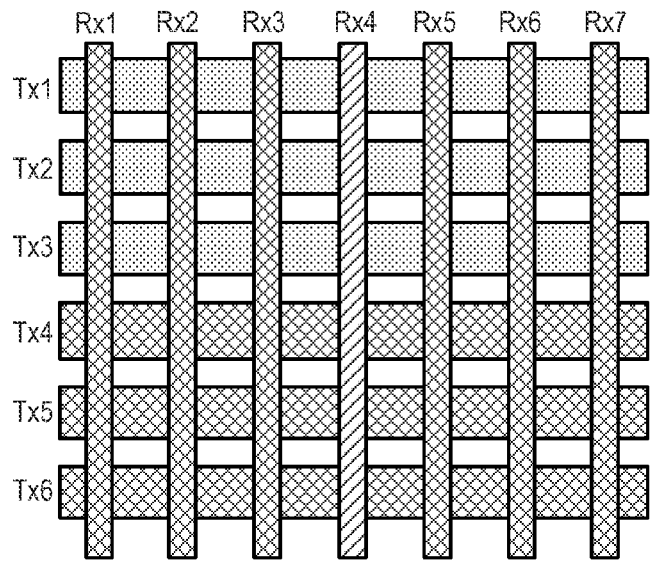

Since the transmitters are guarded and not in subset P, the β-results are attenuated from the maximum value obtainable in the β[E\k]-scheme. FIGS. 9B and 9C show excitation cycles 904-1 and 904-2 of another β-scheme according to an example implementation that can be used to produce β-results with minimum attenuation. In the β-scheme of FIGS. 9B and 9C, different subsets of the transmitter electrodes are added to the subset P of passive electrodes over respective excitation cycles. In the present example, half the transmitters (Tx4-Tx6) are added to P in a first excitation cycle, and the other half of the transmitters (Tx1-Tx3) are added to P in a second excitation cycle. In general, N subsets of the transmitters, S_nˆtx can be defined, where n∈N. In the present example, N=2. In a given excitation cycle, those transmitters not in P are driven with a guard signal. Similar to FIG. 9A, the receiver Rx4 is added to K and driven with a capacitive sensing signal, and receivers Rx1-Rx3 and Rx5-Rx7 are in P.

Thus, FIGS. 9B and 9C show a β[Rx\k U S_nˆtx]-scheme. The β-results from the two excitation cycles of the β[Rx\k U S_1ˆtx]-scheme and the β[Rx\k U S_2ˆtx]-scheme can be combined by the principle of superposition to recover results of the β[E\k]-scheme.

The size of the transmitter subsets S_nˆtx can depend on the amount of additional parasitic background capacitance that the processing system 110C can handle. The parasitic background capacitance is increased from minimum approximately by the number of transmitters in the subset P times the receiver-transmitter transcapacitive coupling (assuming the receiver-receiver coupling is small). However, the parasitic background capacitance of the β[Rx\k U S_nˆtx]-scheme is less than the maximum value in the β[E\k]-scheme. The number N of subsets of transmitter electrodes can be selected based on the dynamic range of the processing system 110C. More dynamic range allows for less subsets N of transmitter electrodes to be added to P and hence less excitation cycles to recover the β[E\k]-scheme. Conversely, less dynamic range requires more subsets N of transmitter electrodes to be added to P and hence more excitation cycles to recover the β[E\k]-scheme.

The excitation schemes in FIGS. 9A-9C can be repeated for additional excitation cycles to drive additional ones of the receivers with a capacitive sensing signal. For example, seven excitation cycles of β-scheme in FIG. 9A can be performed for receivers Rx1 through Rx7. Fourteen excitation cycles of the β-scheme in FIGS. 9B and 9C can be performed for receivers Rx1 through Rx7. Less excitation cycles can be performed if less than all the receivers are selected to be driven with a capacitive sensing signal. In another example, more than one receiver can be driven with a capacitive sensing signal in the same excitation cycle, which will result in a coarser position determination, but less excitation cycles.

In some examples, the excitation schemes in FIGS. 9A-9C can be used when driving the transmitters for capacitive sensing if the transmitters are configured similarly to the receivers (e.g., thinner and more sparsely distributed such that the transmitter-transmitter transcapacitive coupling is small). However, in some examples as described above, the transmitters are wider than the receivers and/or more closely distributed such that the transmitter-transmitter transcapacitive coupling is not negligible and must be considered.

Figure 10A:
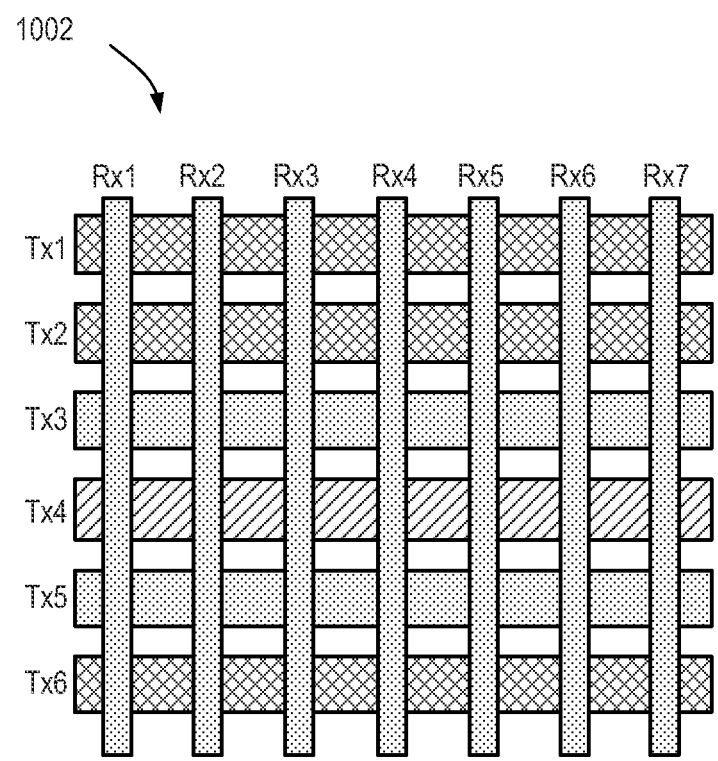

FIG. 10A shows an excitation cycle 1002 of another β-scheme according to an example implementation. The transmitter electrode Tx4 is selected and driven with a capacitive sensing signal. The transmitter electrodes Tx1-Tx2 and Tx6 are driven with a reference signal, and the transmitter electrodes Tx3 and Tx5 are driven with a guard signal. The receiver electrodes Rx1-Rx7 are driven with a guard signal. Thus, FIG. 10A shows a β[Tx\{k, k−1, k+1}]-scheme, where the k−1st, kth, and k+1st transmitters (Tx3-Tx5 in the present example) and the guarded Rx1-Rx7 electrodes are in the subset K and all other electrodes are in the subset P of passive electrodes (Tx1-Tx2 and Tx6).

The difference between parasitic background capacitance for a given β-scheme, where the active electrodes are selected from the transmitters, and the parasitic background capacitance from alpha-scheme can be expressed as:

$$N_{rx}C_t + 2 \cdot C_{tx,tx}^b \qquad \text{Eq. 5,}$$

where $N_{rx}$ is the number of receiver electrodes in the subset P, $C_t$ is the receiver-transmitter transcapacitive coupling, and $C\_(tx,tx)\hat{}b$ is the baseline transmitter-transmitter transcapacitive coupling. In a β[Tx\k]-scheme, there are no receivers in the subset P, and hence the parasitic background capacitance is increased from the minimum by a factor of two times the transmitter-transmitter transcapacitive coupling. In an embodiment, the processing system 110C can employ β[Tx\{k, k−1 k+1}]-scheme if the processing system 110C does not have the dynamic range to handle even one times the transmitter-transmitter transcapacitive coupling. In such excitation scheme, the neighboring transmitters to the kth transmitter are driven with a guard signal, reducing or eliminating the transmitter-transmitter transcapacitive coupling.

Since the receivers are guarded and not in subset P, the β-results are attenuated from the maximum value obtainable in the β[E\k]-scheme. FIGS. 10B and 10D show three excitation cycles 1004-1 through 1004-3 of another β-scheme according to an example implementation that can be used to produce β-results with less attenuation. In the β-scheme of FIGS. 10B and 10O, different subsets of the receiver electrodes are added to the subset P of passive electrodes over respective excitation cycles. In the present example, three receivers (Rx1-Rx3) are added to P in one excitation cycle, three receivers (Rx4-Rx6) are added to P in a second excitation cycle, and one receiver (Rx7) is added to P in a third excitation cycle. In general, N subsets of the receivers, S_nˆrx can be defined, where n ∈N. In the present example, N=3. In any excitation cycle, those receivers not in P are driven with a guard signal. Similar to FIG. 10A, the transmitter Tx4 is added to K and driven with a capacitive sensing signal, transmitters Tx1-Tx2 and Tx6 are driven with a reference signal, and Tx3 and Tx6 are driven with a guard signal.

Thus, FIGS. 10B-10D show a β[Tx\{k, k−1, k+1}U S_nˆtx]-scheme. The β-results from the three excitation cycles of the aforementioned excitation scheme can be combined by the principle of superposition to recover β-results of a β[E\{k, k−1, k+1}]-scheme. Any number N of subsets of the receivers can be added to P over N excitation cycles depending on the dynamic range of the processing system 110C.

Figure 11A:
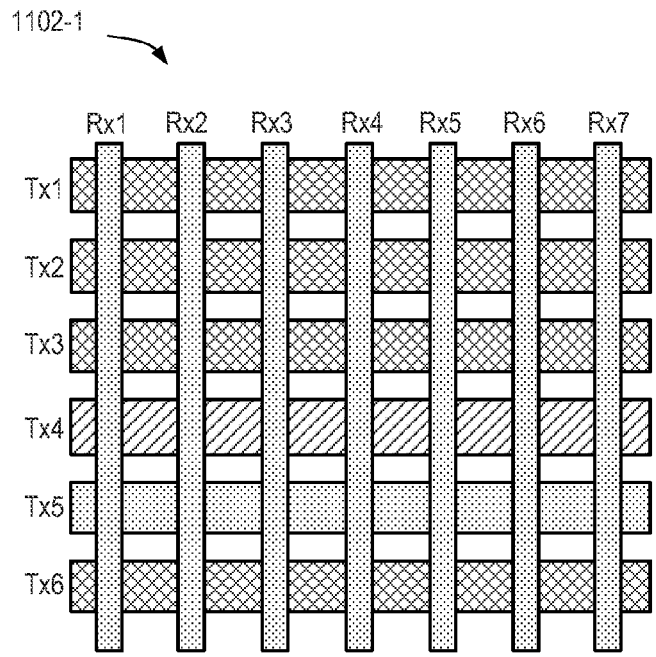
Figure 11B:
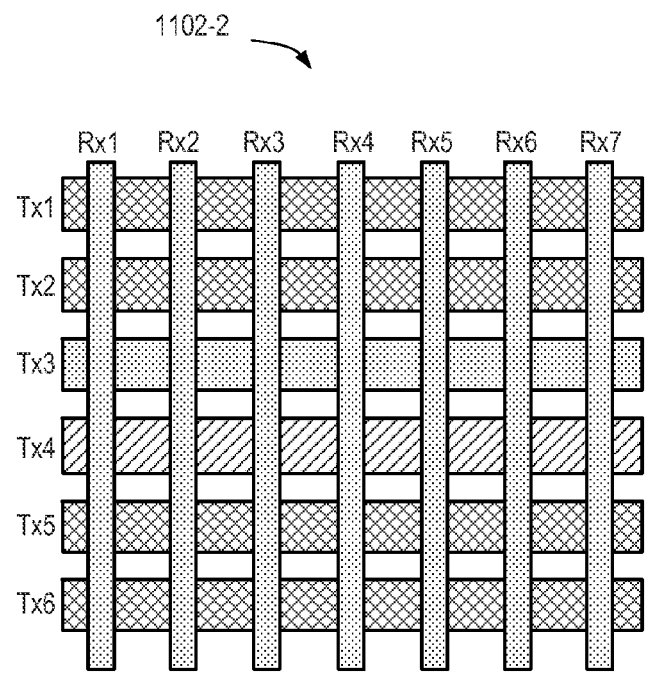

In the β[Tx\{k, k−1, k+1}U S_nˆtx]-scheme, signal attenuation is not minimized due to the k−1$^{st}$ and k+1$^{st}$ transmitters being guarded throughout the excitation scheme. In an embodiment, the processing system 110C can handle an increase in parasitic background capacitance contributed by one transmitter-transmitter transcapacitive coupling. FIGS. 11A and 11B show excitation cycles 1102-1 and 1102-2 of another β-scheme according to an example implementation that can be used to produce β-results with minimum attenuation. The transmitter electrode Tx4 is selected and driven with a capacitive sensing signal. The receiver electrodes Rx1-Rx7 are driven with a guard signal. In the excitation cycle 1102-1, the transmitter electrodes Tx1-Tx3 and Tx6 are driven with a reference signal, and the transmitter electrode. Tx5 is driven with a guard signal. In the excitation cycle 1102-2, the transmitter electrodes Tx1-Tx2 and Tx5-6 are driven with a reference signal, and the transmitter electrode Tx3 is driven with a guard signal. Thus, FIGS. 11A-11B show a β[Tx\{k, k3±1}]-scheme, where the kth and k±1st transmitters and the guarded Rx1-Rx7 electrodes are in the subset E and all other electrodes are in the subset P of passive electrodes. The β-results of the excitation cycles 1102-1 and 1102-2 can be combined by the principle of superposition to receiver β-results of the β[E\k]-scheme having the minimum attenuation.

FIG. 7 is a flow diagram depicting a method 700 of driving sensor electrodes for capacitive sensing in an example implementation. The method 700 begins at step 702, where the processing system 110C acquires near-field absolute and/or transcapacitance measurements. At step 704, the processing system 110C determines whether the measurements satisfy a near-field threshold. If so, the method 700 proceeds to step 706, where the processing system 110C determines position of input object(s) using near-field measurements. Otherwise, the method 700 proceeds to step 708. One type of near-field threshold is a transcapacitance threshold. A maximum transcapacitance measurement can be compared to a near-field transcapacitance threshold. If greater than the threshold, the method 700 proceeds to step 706. Otherwise, the method 700 proceeds to step 708. Another type of near-field threshold is an object-electrode coupling threshold (e.g., absolute capacitance threshold). A maximum absolute capacitance measurement can be compared to a near-field absolute capacitance threshold. If the absolute capacitance measurement indicates the object-electrode meets the threshold, the method 700 proceeds to step 706. Otherwise, the method 700 proceeds to step 708. In an embodiment, a combination of transcapacitance and absolute capacitance thresholds can be employed.

At step 708, the processing system 110C determines whether the measurements satisfy a far-field threshold. If not, the method 700 proceeds to step 710, where the processing system 110C determines that no object is in the sensing range. Otherwise, the method 700 proceeds to step 712. One type of far-field threshold is a transcapacitance threshold. If the sum of all transcapacitance measurements is less than a far-field transcapacitance threshold, the method 700 proceeds to step 712. Otherwise, the method 700 proceeds to step 710. Another type of far-field threshold is an absolute capacitance threshold. If the sum of all absolute capacitance measurements exceeds a far-field absolute capacitance threshold, the method 700 proceeds to step 712. Otherwise, the method 700 proceeds to step 710.

At step 712, the processing system 110C acquires far-field measurements. For example, the processing system 110C can employ excitation cycle(s) of one or more β-schemes, as described above. At step 714, the processing system 110C determines position of input object(s) using far-field measurements.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system, comprising:
a sensor module comprising sensor circuitry, the sensor module configured to: drive, during a first time period, a first sensor electrode of a first plurality of sensor electrodes for absolute capacitive sensing, a second sensor electrode of the first plurality of sensor electrodes with a reference signal, and at least one sensor electrode of a second plurality of sensor electrodes with a guard signal, to acquire first changes of capacitance between the first sensor electrode and at least one input object in proximity with the first sensor electrode; and
a determination module configured to determine positional information for the at least one input object based at least in part on changes of capacitance acquired by the sensor module.

2. The processing system of claim 1, wherein the sensor module is configured to:
drive, during a second time period, the second sensor electrode for absolute capacitive sensing, the first sensor electrode with a reference signal, and the at least one sensor electrode with a guard signal to acquire second changes in capacitance between the second sensor electrode and the at least one input object.

3. The processing system of claim 1, wherein the sensor module is configured to:
drive, during the first time period, all of the second plurality of sensor electrodes with a guard signal.

4. The processing system of claim 1, wherein the sensor module is configured to:
drive, during the first time period, at least one additional sensor electrode of the second plurality of sensor electrodes with a reference signal.

5. The processing system of claim 1, wherein the sensor module is configured to:
drive, during the first time period, a third sensor electrode of the first plurality of sensor electrodes with a guard signal, the third sensor electrode being disposed proximate the first sensor electrode.

6. The processing system of claim 1, wherein the sensor module is configured to:
drive, during a second time period, a first sensor electrode of the second plurality of sensor electrodes for absolute capacitive sensing, a second sensor electrode of the second plurality of sensor electrodes with a reference signal, and at least one sensor electrode of the first plurality of sensor electrodes with a guard signal to acquire second changes in capacitance between the first sensor electrode of the second plurality of sensor electrodes and the at least one input object.

7. The processing system of claim 6, wherein the sensor module is configured to:
drive, during the second time period, a third sensor electrode of the second plurality of sensor electrodes with a guard signal, the third sensor electrode being disposed proximate the first sensor electrode of the second plurality of sensor electrodes.

8. The processing system of claim 6, wherein the sensor module is configured to:
drive, during a third time period, the second sensor electrode of the second plurality of sensor electrodes for absolute capacitive sensing, the first sensor electrode of the second plurality of sensor electrodes with a reference signal, and the at least one sensor electrode of the first plurality of sensor electrodes with a guard signal to acquire third changes in capacitance between the second sensor electrode of the second plurality of sensor electrodes and the at least one input object.

9. The processing system of claim 1, wherein the sensor module is configured to:
drive the second plurality of sensor electrodes with transmitter signals and receive resulting signals from the first plurality of sensor electrodes, the resulting signals comprising effects corresponding to the transmitter signals to detect whether an input object is in a first region of a sensing region, the first region being between an input surface and a second region;
where the at least one input object generating the first changes of capacitance is in the second region.

10. The processing system of claim 9, wherein the sensor module is configured to drive the first sensor electrode for absolute capacitive sensing, the second sensor electrode with a reference signal, and the at least one sensor electrode with a guard signal during the first time period in response to failure to detect an input object in the first region.

11. The processing system of claim 1, wherein the sensor module is configured to drive, during the first time period, the first sensor electrode and at least one additional sensor electrode of the first plurality of sensor electrodes for absolute capacitive sensing.

12. A method of driving sensor electrodes for capacitive sensing, comprising:
  driving, during a first time period, a first sensor electrode of a first plurality of sensor electrodes for absolute capacitive sensing, a second sensor electrode of the first plurality of sensor electrodes with a reference signal, and at least one sensor electrode of a second plurality of sensor electrodes with a guard signal, to acquire first changes of capacitance between the first sensor electrode and at least one input object in proximity with the first sensor electrode; and
  detecting the at least one input object based at least in part on changes of capacitance acquired by the sensor module.

13. The method of claim 12, further comprising:
  driving, during the first time period, at least one additional sensor electrode of the second plurality of sensor electrodes with a reference signal.

14. The method of claim 12, further comprising:
  drive, during the first time period, a third sensor electrode of the first plurality of sensor electrodes with a guard signal, the third sensor electrode being disposed proximate the first sensor electrode.

15. The method of claim 12, further comprising:
  driving the second plurality of sensor electrodes with transmitter signals and receiving resulting signals from the first plurality of sensor electrodes, the resulting signals comprising effects corresponding to the transmitter signals to detect whether an input object is in a first region of a sensing region, the first region being between an input surface and a second region;
  where the at least one input object generating the first changes of capacitance is in the second region.

16. An input device, comprising:
  first plurality of sensor electrodes and a second plurality of sensor electrodes;
  a processing system coupled to the first and second pluralities of sensor electrodes, the processing system configured to:
    drive, during a first time period, a first sensor electrode of a first plurality of sensor electrodes for absolute capacitive sensing, a second sensor electrode of the first plurality of sensor electrodes with a reference signal, and at least one sensor electrode of a second plurality of sensor electrodes with a guard signal, to acquire first changes of capacitance between the first sensor electrode and at least one input object in proximity with the first sensor electrode; and
    detect the at least one input object based at least in part on changes of capacitance acquired by the sensor module.

17. The input device of claim 16, wherein the first plurality of sensor electrodes are disposed orthogonal to the second plurality of sensor electrodes.

18. The input device of claim 16, wherein the processing system is configured to:
  drive, during the first time period, at least one additional sensor electrode of the second plurality of sensor electrodes with a reference signal.

19. The input device of claim 16, wherein the processing system is configured to:
  drive, during the first time period, a third sensor electrode of the first plurality of sensor electrodes with a guard signal, the third sensor electrode being disposed proximate the first sensor electrode.

20. The input device of claim 16, wherein the processing system is configured to:
  drive the second plurality of sensor electrodes with transmitter signals and receive resulting signals from the first plurality of sensor electrodes, the resulting signals comprising effects corresponding to the transmitter signals to detect whether an input object is in a first region of a sensing region, the first region being between an input surface and a second region;
  where the at least one input object generating the first changes of capacitance is in the second region.

* * * * *